US012474655B2

(12) United States Patent
Muramatsu

(10) Patent No.: US 12,474,655 B2
(45) Date of Patent: Nov. 18, 2025

(54) HEATING DEVICE AND IMAGE FORMING APPARATUS

(71) Applicant: CANON KABUSHIKI KAISHA, Tokyo (JP)

(72) Inventor: Motoyasu Muramatsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/669,369

(22) Filed: May 20, 2024

(65) Prior Publication Data

US 2024/0310760 A1 Sep. 19, 2024

Related U.S. Application Data

(63) Continuation of application No. 18/057,640, filed on Nov. 21, 2022, now Pat. No. 12,019,385.

(30) Foreign Application Priority Data

Nov. 29, 2021 (JP) ................................ 2021-192726

(51) Int. Cl.
*G03G 15/20* (2006.01)

(52) U.S. Cl.
CPC ..... *G03G 15/2046* (2013.01); *G03G 15/2053* (2013.01); *G03G 15/2064* (2013.01); *G03G 2215/2019* (2013.01)

(58) Field of Classification Search
CPC ........... G03G 15/2017; G03G 15/2046; G03G 15/2053; G03G 15/206; G03G 15/2064; G03G 15/5004; G03G 21/1647; G03G 2215/2035; G03G 2215/2019
See application file for complete search history.

(56) References Cited

U.S. PATENT DOCUMENTS 10,845,740 B2 * 11/2020 Furuichi ............ G03G 15/2053

FOREIGN PATENT DOCUMENTS

JP 2019012199 A 1/2019

* cited by examiner

*Primary Examiner* — Hoang X Ngo
(74) *Attorney, Agent, or Firm* — Canon U.S.A., Inc. IP Division

(57) ABSTRACT

A heating device includes an elongated heater, a first holding member configured to hold the heater, a power shut-off member configured to shut off power supply to the heater, a second holding member configured to hold the power shut-off member, a first urging member configured to press the power shut-off member against the heater, and a regulation member configured to regulate a position of the second holding member, wherein, in a longitudinal direction of the heater, one end side of the second holding member is urged by the first urging member, and another end side of the second holding member is regulated in position by the regulation member.

11 Claims, 14 Drawing Sheets

HEATING DEVICE AND IMAGE FORMING APPARATUS

CROSS-REFERENCE TO RELATED APPLICATIONS

The present application is a continuation of U.S. patent application Ser. No. 18/057,640, filed on Nov. 21, 2022, which claims priority from Japanese Patent Application No. 2021-192726, filed Nov. 29, 2021, which are hereby incorporated by reference herein in their entireties.

This application claims the benefit of Japanese Patent Application No. 2021-192726, filed Nov. 29, 2021, which is hereby incorporated by reference herein in its entirety.

BACKGROUND OF THE INVENTION

Field of the Invention

The present invention relates to a heating device and an image forming apparatus such as a copier, a printer, and a facsimile, adopting an electrophotographic system, an electrostatic recording system, or the like.

Description of the Related Art

As a heating device in an image forming apparatus, a configuration including a film, a heater disposed in an internal space of the film, a holding member holding the heater, and a reinforcing member reinforcing the holding member has been known. Examples of the heater include a sheet heater including a sheet heating element on a ceramic substrate, the heater being held by a heater holder made of a resin as the holding member. A through hole is provided in a part of the holding member in a longitudinal direction, and a thermistor is disposed in a space between the holding member and the reinforcing member to detect a temperature of the heater. The heater is controlled based on the temperature detected by the thermistor. Likewise, a protection element such as a thermostat and a temperature fuse is also provided in the space between the holding member and the reinforcing member. The protection element is also in contact with the heater via another through hole provided in the holding member. The protection element is a power shut-off member that shuts off power supply to the heater in a case where the temperature of the heater exceeds a predetermined temperature.

The power shut-off member is disposed so as to come into contact with the heater. At this time, if contact pressure to the heater is low or a clearance is generated between the power shut-off member and the heater, responsiveness to the temperature is varied. Therefore, as discussed in Japanese Patent Application Laid-Open No. 2013-41096, the power shut-off member is urged toward the heater by a plurality of urging members such compression springs and composite springs. This makes it possible to bring the power shut-off member into contact with the heater at predetermined pressure.

When both sides of the power shut-off member are urged by the urging members, urging force can be applied; however, a space for arranging the plurality of urging member is necessary and the number of components is increased.

SUMMARY OF THE INVENTION

According to an aspect of the present invention, a heating device includes an elongated heater, a first holding member configured to hold the heater, a power shut-off member configured to shut off power supply to the heater, a second holding member configured to hold the power shut-off member, a first urging member configured to press the power shut-off member against the heater, and a regulation member configured to regulate a position of the second holding member, wherein, in a longitudinal direction of the heater, one end side of the second holding member is urged by the first urging member, and another end side of the second holding member is regulated in position by the regulation member.

Further features of the present invention will become apparent from the following description of exemplary embodiments with reference to the attached drawings.

DESCRIPTION OF THE EMBODIMENTS

Some exemplary embodiments of the present invention will be described below with reference to drawings. The following exemplary embodiments do not limit the invention according to the claims, and all of combinations of characteristics described in the exemplary embodiments are not necessarily essential for solving means of the invention.

Image Forming Apparatus

Figure 1:
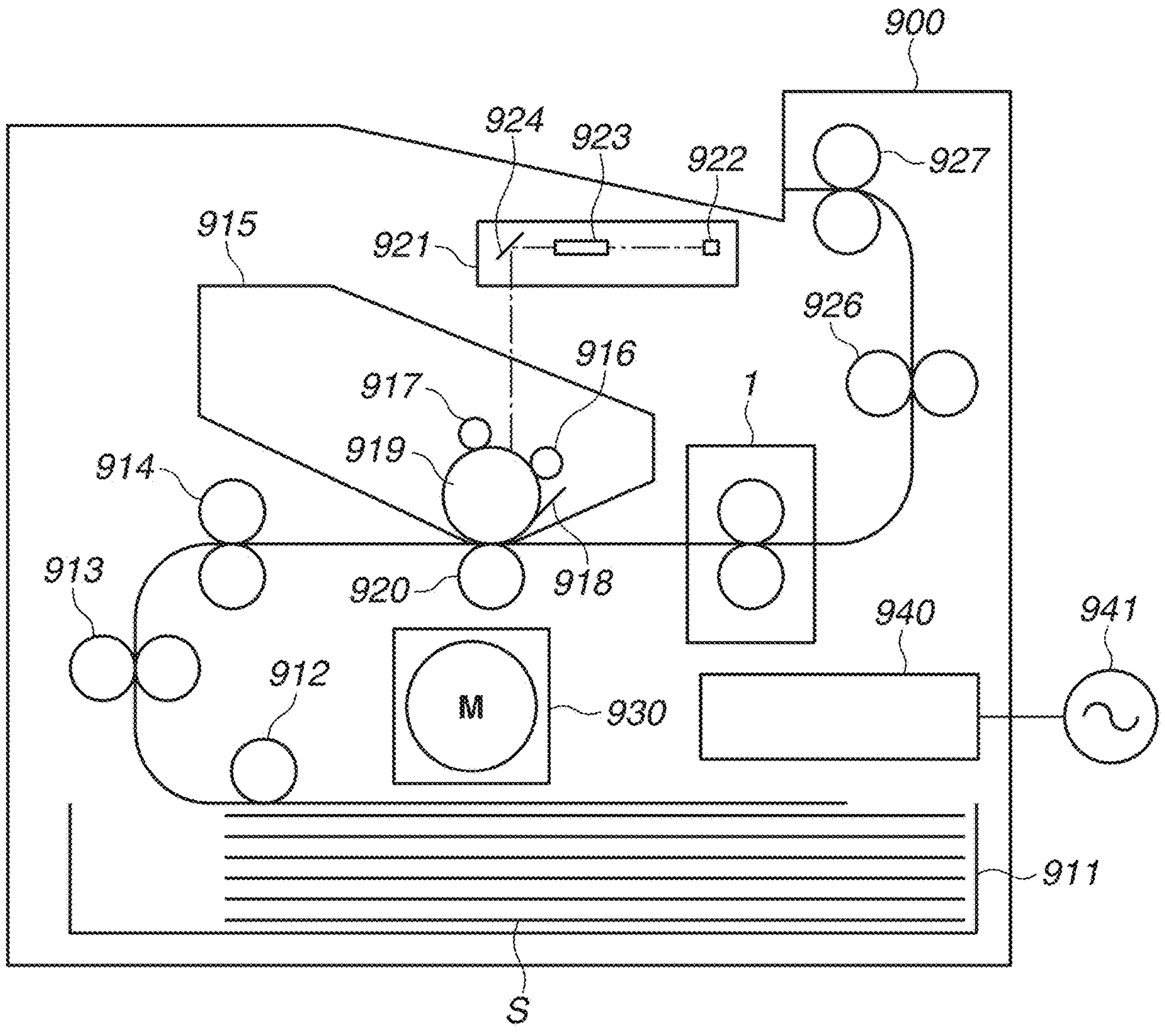
FIG. 1 is a schematic configuration diagram of an image forming apparatus.

A first exemplary embodiment will be described. FIG. 1 is a schematic configuration diagram of an image forming apparatus 900. When a print signal is generated, a scanner unit 921 emits a laser beam modulated based on image information to scan a photosensitive drum 919 that is a photosensitive body charged to a predetermined polarity by a charging roller 916. As a result, an electrostatic latent image is formed on the photosensitive drum 919. A developing unit 917 supplies toner to the electrostatic latent image, and a toner image corresponding to the image information is formed on the photosensitive drum 919. On the other hand, sheets S loaded in a sheet feeding cassette 911 are fed one by one by a pickup roller 912, and each sheet S is conveyed by a roller 913 toward a registration roller 914. Further, the sheet S is conveyed from the registration roller 914 to a transfer position formed by the photosensitive drum 919 and a transfer roller 920 in synchronization with a timing when the toner image on the photosensitive drum 919 reaches the transfer position.

The toner image on the photosensitive drum 919 is transferred to the sheet S while the sheet S passes through the transfer position. Thereafter, the sheet S is heated by a fusing device 1, and the toner image is heated and fixed onto the sheet S. The sheet S carrying the fixed toner image is discharged to a tray on an upper part of the image forming apparatus 900 by rollers 926 and 927.

Note that toner remaining on the photosensitive drum 919 is cleaned by a cleaner 918.

A motor 930 is a driving source driving the fusing device 1 and the like. Power is supplied from a control circuit 940 connected to a commercial alternating-current power supply 941 to the fusing device 1. The photosensitive drum 919, the charging roller 916, the scanner unit 921, the developing unit 917, and the transfer roller 920 described above configure an image forming unit that forms an unfixed image on the sheet S. A cartridge 915 is a unit replaceable for the image forming apparatus 900. The scanner unit 921 includes a light source 922, a polygon mirror 923, and a reflective mirror 924.

Fusing Device

Figure 2:
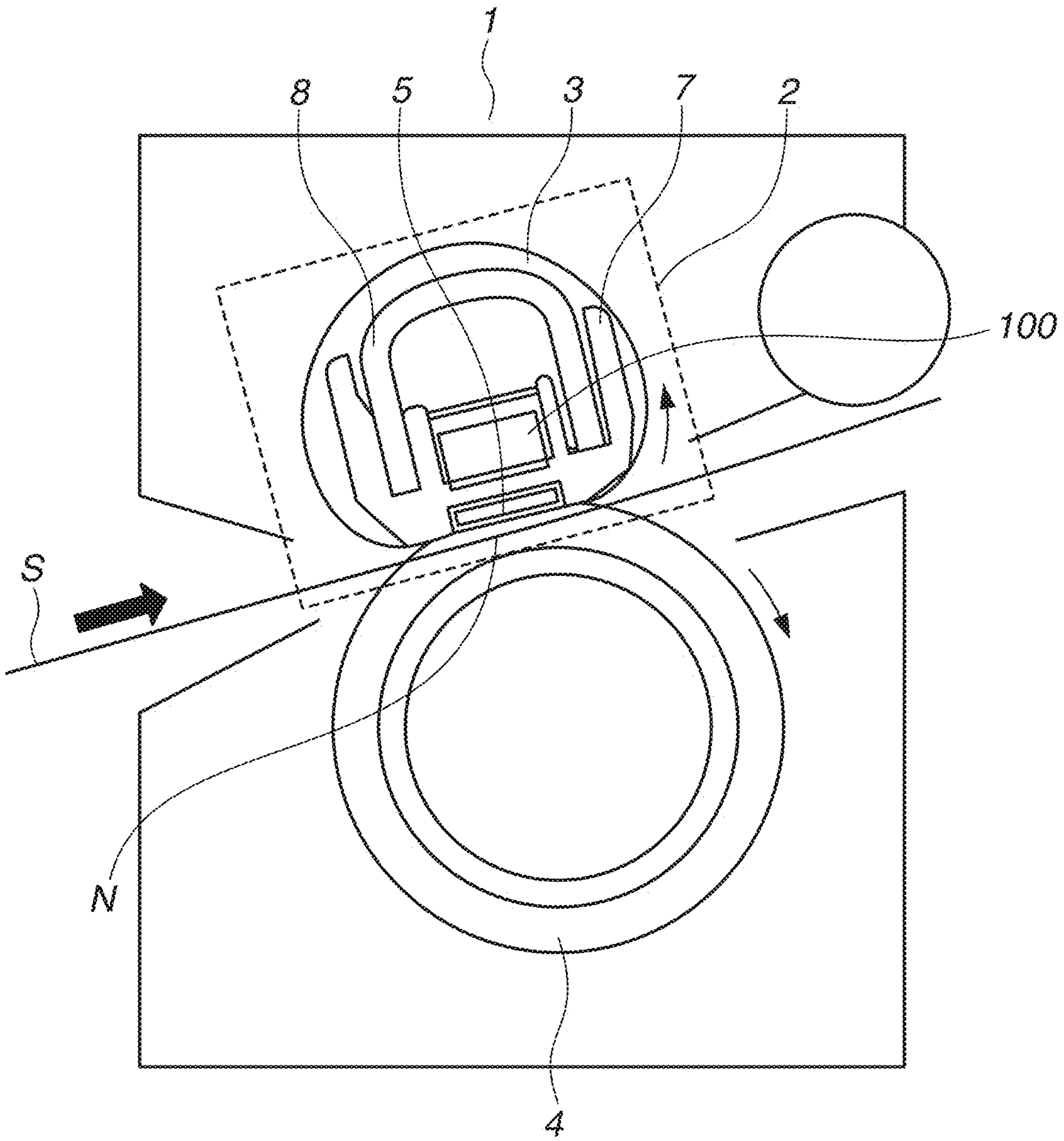
FIG. 2 is a cross-sectional view of a fusing device.

Next, a configuration of the fusing device 1 will be described with reference to FIG. 2 and FIG. 3. FIG. 2 is a cross-sectional view of the fusing device 1 in a conveyance direction of the sheet S. The fusing device 1 includes a heating device 2 including a cylindrical film 3 as a flexible rotatable first rotor, and a pressure roller 4 as a second rotor that presses the heating device 2 by a pressurizing unit (not illustrated) to form a nip portion N. The sheet S is sandwiched and conveyed by the nip portion N, and the toner image on the sheet S is heated to be fixed onto the sheet S.

Figure 3:
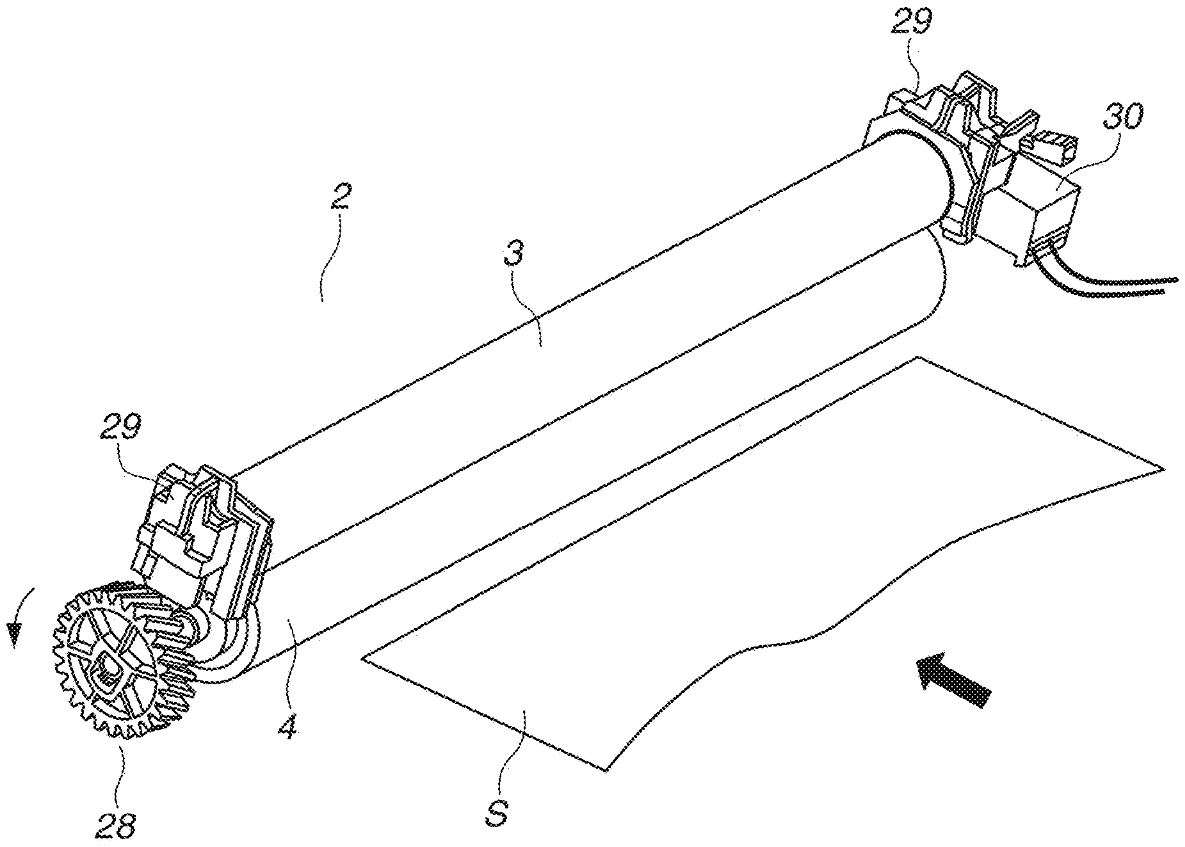
FIG. 3 is a schematic configuration diagram of a heating device and a pressure roller.

FIG. 3 is a schematic configuration diagram of the heating device 2 and the pressure roller 4. The heating device 2 and the pressure roller 4 are supported at both ends in a longitudinal direction by a frame (not illustrated) of the fusing device 1. The pressure roller 4 is rotationally driven when driving force is transmitted from a driving source (not illustrated) to a driving gear 28. The film 3 abutting on the pressure roller 4 is configured to rotate following the pressure roller 4.

An elongated heater 5 is disposed in an internal space of the film 3. The conveyance direction of the sheet S in FIG. 2 is a transverse direction of the heater 5 that is a right-left direction in FIG. 2. A direction orthogonal to the transverse direction is a longitudinal direction of the heater 5 that is a front-back direction in FIG. 2. Further, a direction orthogonal to the transverse direction and the longitudinal direction is a thickness direction of the heater 5 that is an up-down direction in FIG. 2.

The heater 5 is disposed to be slidable with an inner peripheral surface of the film 3. Inner surfaces at both ends of the film 3 in the longitudinal direction are supported by flanges 29. Grease is applied between the heater 5 and the film 3 in order to improve slidability.

The heater 5 is configured to be energized by an energization unit (not illustrated) from a connector 30 that is an electric contact, and to generate heat by receiving power. In the internal space of the film 3, the heater 5 is held by a heater holder 7 that is a holding member provided substantially in parallel with the film 3. Further, the nip portion N formed by the film 3 and the pressure roller 4 preferably has a uniform width in a rotation axis direction that is the longitudinal direction of the film 3. Therefore, the heater holder 7 is provided with a metal frame member 8 as a reinforcing member, on an opposite side of the pressure roller 4 with the heater holder 7 in between, in order to reinforce strength against force by pressure contact. The frame member 8 receives pressing force from the pressurization unit (not illustrated) via the flanges 29 provided at both ends. Although details will be described below, the frame member 8 as the reinforcing member also serves as a regulation member regulating a position of a thermostat holder 102. Further, in place of the frame member 8, the heater holder 7 as the holding member can serve as the regulation member regulating the position of the thermostat holder 102.

Figure 4:
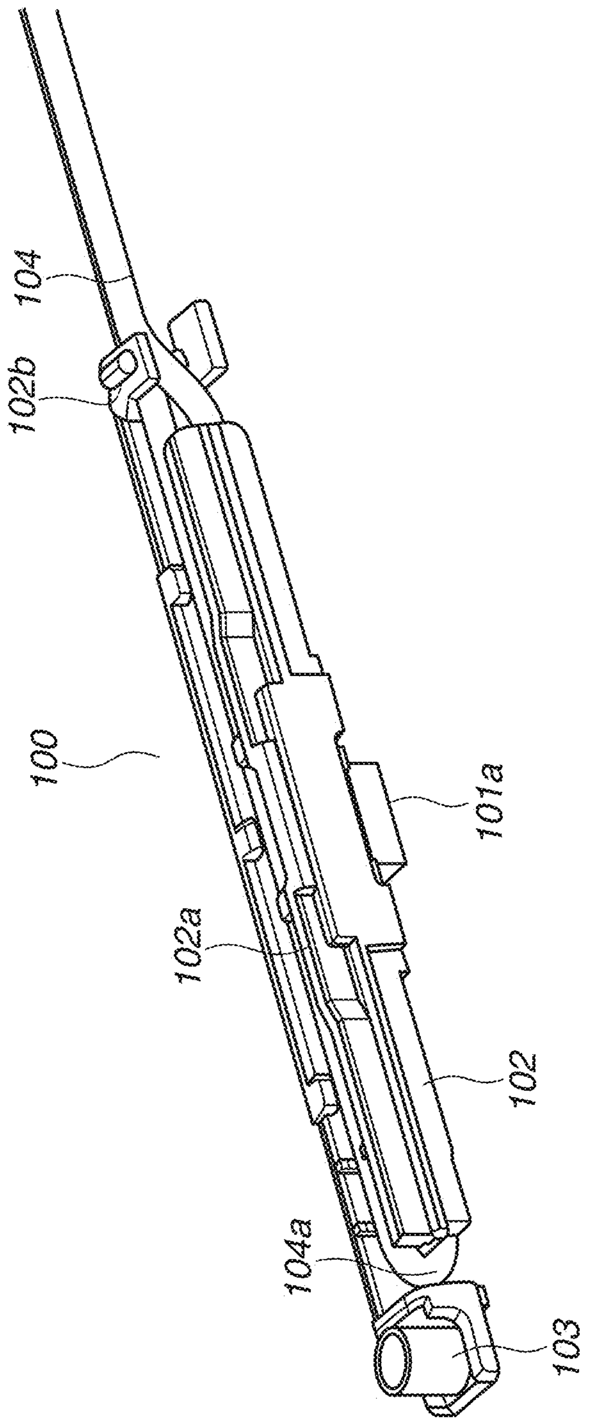
FIG. 4 is a schematic configuration diagram of a thermostat unit.

FIG. 4 is a schematic configuration diagram of a thermostat unit 100. A thermostat 101 as a power shut-off member is held by the thermostat holder 102 as a holding member. An abutting portion 101*a* of the thermostat 101 internally configures an electric contact via a bimetal. In a case where a surface of the abutting portion 101*a* is disposed to abut on the heater 5, and the heater 5 generates heat to a predetermined temperature or more, connection of the electric contact is disconnected by reverse of the bimetal, to shut off power supply (energization) to the heater 5.

To cause the thermostat 101 to respond to heat of the heater 5 with high responsiveness, the abutting portion 101*a* desirably stably abuts on the heater 5. Therefore, the thermostat holder 102 is pressed against the heater 5 by a thermostat spring 103 that includes a compression spring as an urging member. An electric wire 104 of the thermostat 101 is housed in an electric wire guide portion 102*a* of the thermostat holder 102. The thermostat spring 103 is disposed on an end side of a folded portion 104*a* of the electric wire 104 in a longitudinal direction of the thermostat 101.

Figure 5:
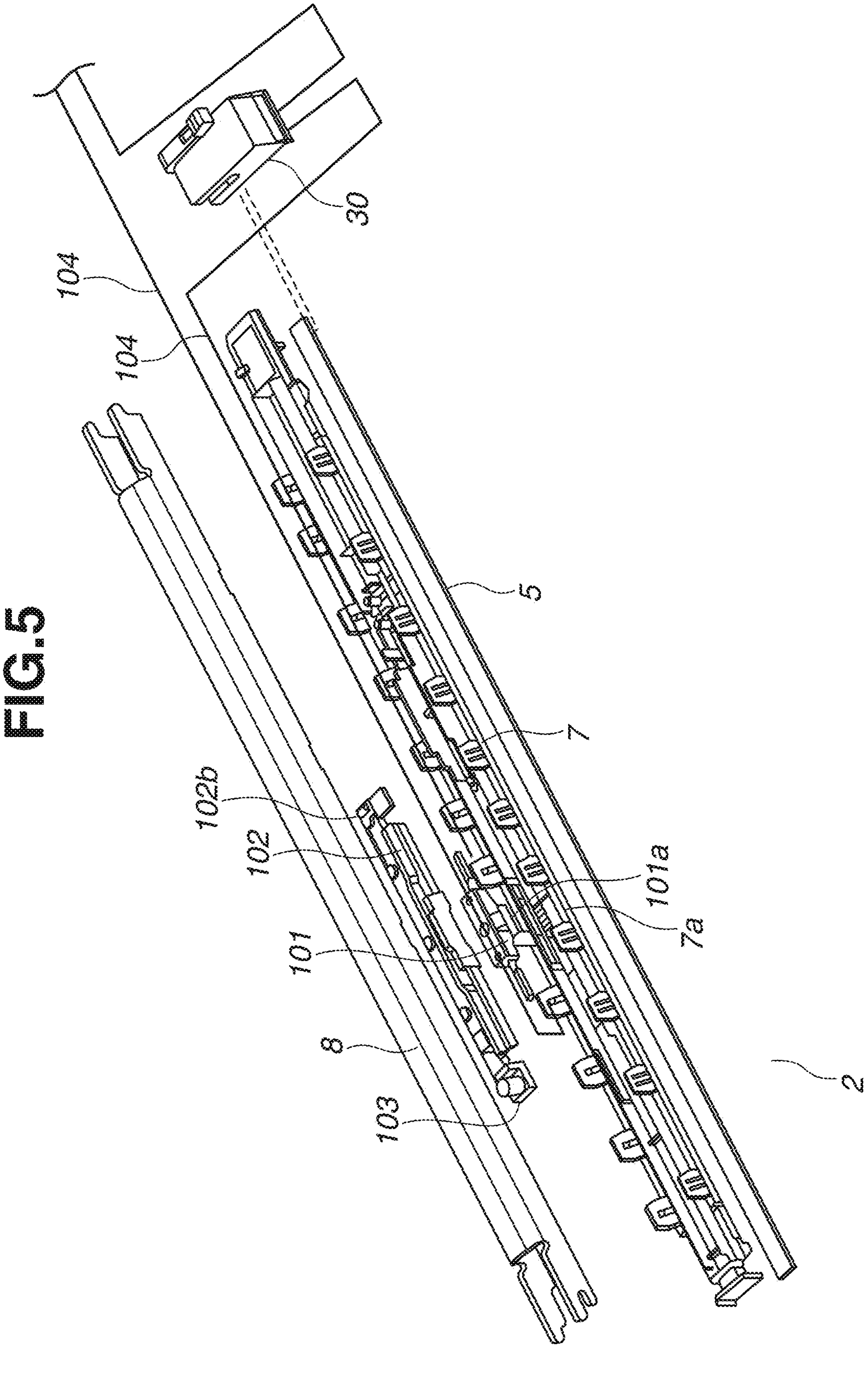
FIG. 5 is an exploded diagram illustrating a configuration of each member in the heating device.
Figure 6:
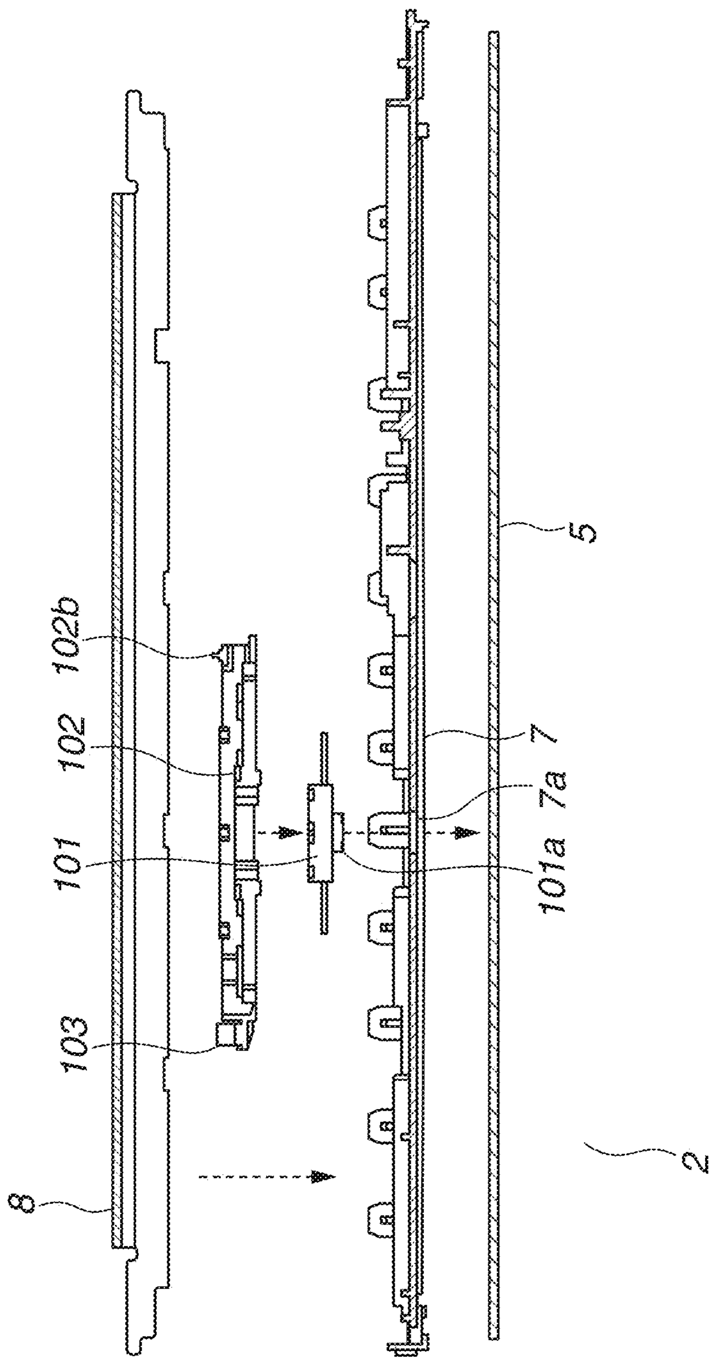
FIG. 6 is a cross-sectional view of the heating device in a longitudinal direction.
Figure 7:
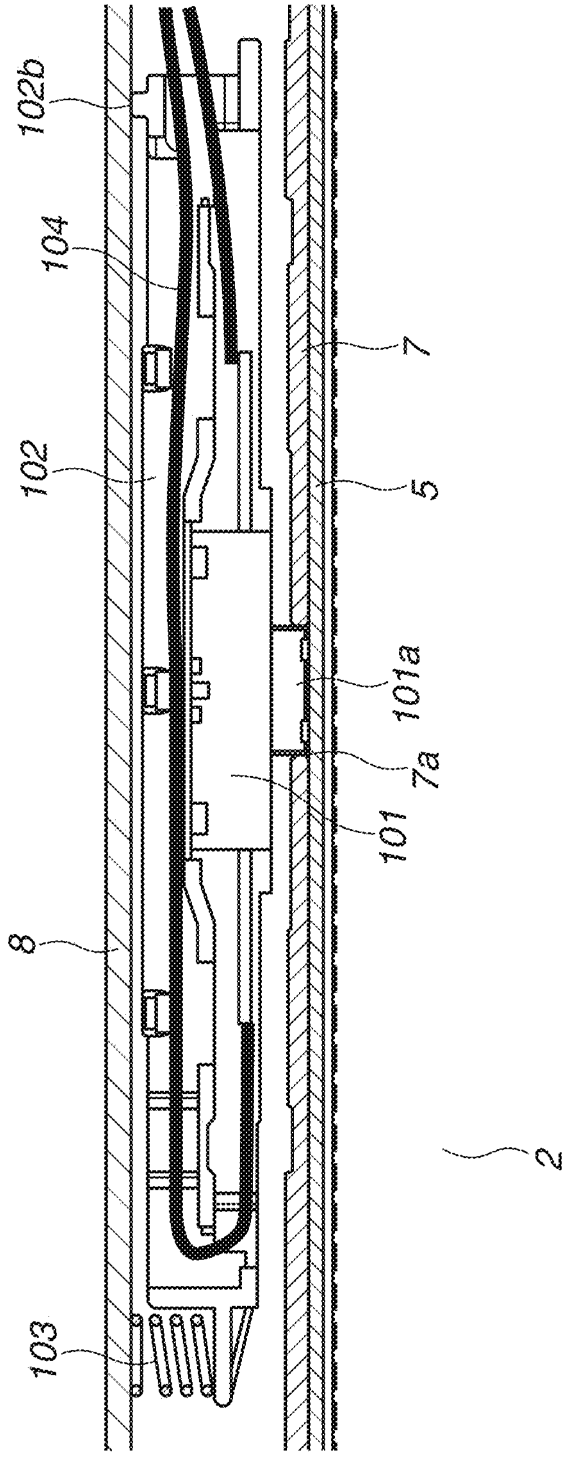
FIG. 7 is a cross-sectional view of a vicinity of the thermostat unit in the longitudinal direction.

FIG. 5 is an exploded diagram illustrating a configuration of each member in the heating device 2. FIG. 6 is a cross-sectional view of the heating device 2 in the longitudinal direction. FIG. 7 is a cross-sectional view of a vicinity of the thermostat 101 of the heating device 2 in the longitudinal direction. The thermostat 101 is disposed such that the abutting portion 101*a* engages with a hole portion 7*a* that is an opening provided near a center part of the heater holder 7 in the longitudinal direction. The thermostat holder 102 holding the thermostat 101 is disposed at a position sandwiched between the heater holder 7 and the frame member 8, namely, is disposed between the heater holder 7 and the frame member 8 in the thickness direction of the heater 5. In the longitudinal direction of the heater 5, the thermostat spring 103 provided on one end side of the thermostat holder 102 is locked to the frame member 8, and presses the thermostat holder 102 against the heater 5. For example, the thermostat spring 103 provided on one end side of the thermostat holder 102 urges the one end side of the thermostat holder 102 towards the heater 5 such that the thermostat 101 is pressed against the heater 5. A fulcrum 102*b* provided on the other end side of the thermostat holder 102 is also locked to the frame member 8. In other words, the other end side of the thermostat holder 102 is regulated in position by the frame member 8.

Figure 8:
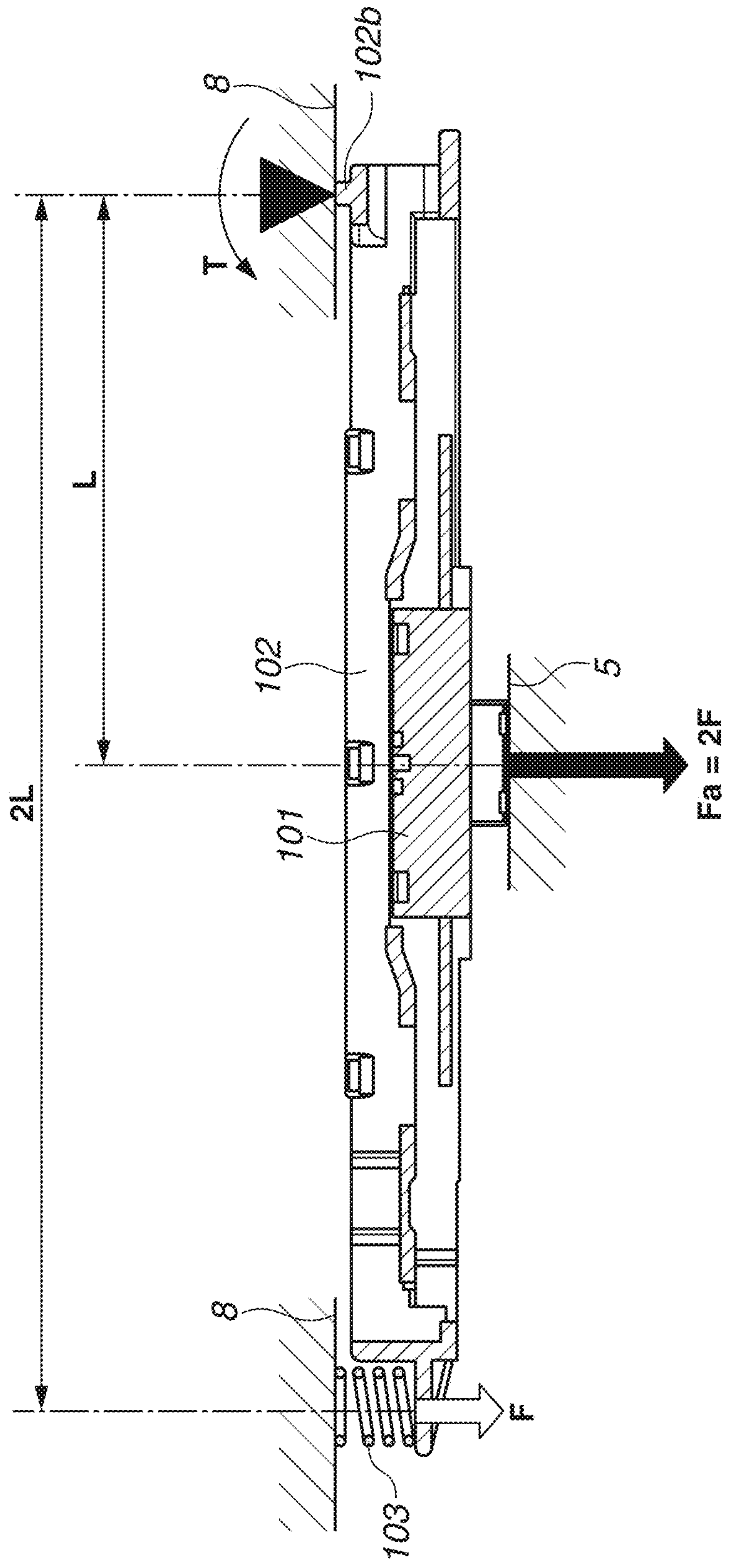
FIG. 8 is a diagram illustrating relationship of force acting on the thermostat unit.

FIG. 8 is a diagram illustrating relationship of force acting on the thermostat holder 102. 2L denotes a distance from the fulcrum 102*b* of the thermostat holder 102 to the thermostat spring 103, and L denotes a distance from the fulcrum 102*b* to the abutting portion 101*a* of the thermostat 101. The one end side of the thermostat holder 102 is urged by the thermostat spring 103, and urging force F (white arrow in FIG. 8) is generated. The urging force F generates a moment T on the other end side of the thermostat holder 102. As a result, force Fa (black arrow in FIG. 8) acts on the abutting portion 101*a*. From relationship of T=F×2L=Fa×L, Fa=2F is established.

In the present exemplary embodiment, to cause the abutting portion 101*a* of the thermostat 101 to abut on the heater 5 with the force of 400 gf, a load of the thermostat spring 103 is set to 200 gf. Note that the distance from the fulcrum 102*b* to the abutting portion 101*a* and the distance from the fulcrum 102*b* to the thermostat spring 103 have relationship of 1:2; however, the relationship is not limited thereto. In a case where the distance relationship is changed, it is sufficient to appropriately change spring pressure of the thermostat spring 103 based on the above-described relationship of the moment and the force.

As described above, the one end side of the thermostat 101 is urged by the thermostat spring 103, and the fulcrum 102*b* on the other end side is regulated in position by the frame member 8. This makes it possible to press the abutting portion 101*a* against the heater 5 without urging both sides of the thermostat 101 by springs. The configuration requiring the thermostat spring 103 only on one side is adopted, which makes it possible to suppress increase in space by the springs and leads to downsizing. Further, on the other side on which no thermostat spring 103 is disposed, a space generated due to disposition of no spring can be utilized as a space for wiring of the electric wire 104, which makes it possible to downsize the heating device 2.

In a second exemplary embodiment, disposition of a thermistor 201 will be described in addition to the thermostat 101. Configurations similar to the configurations according to the above-described first exemplary embodiment, for example, the image forming apparatus, are denoted by similar reference numerals, and detailed descriptions are omitted in the present exemplary embodiment.

Figure 9:
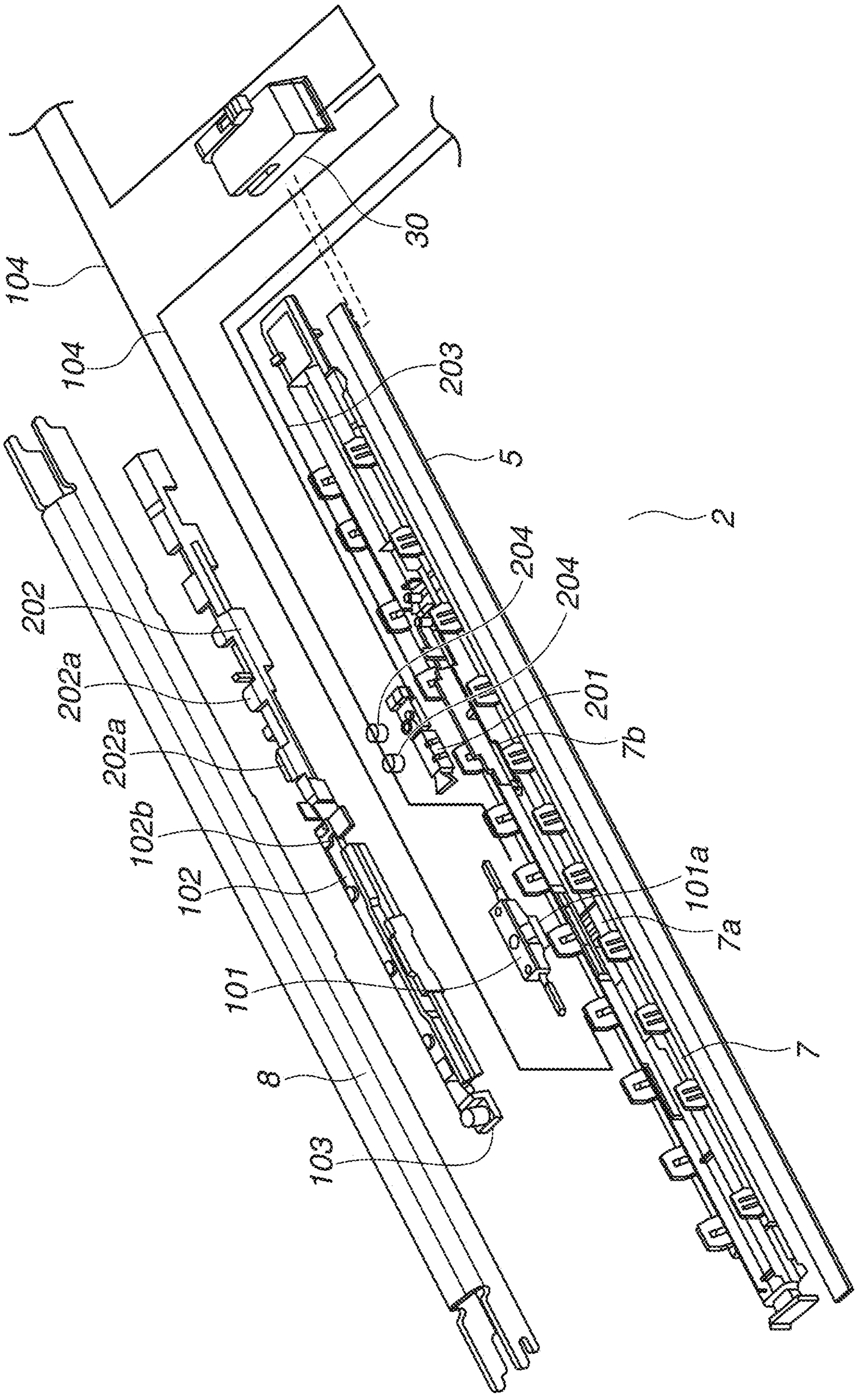
FIG. 9 is an exploded diagram illustrating a configuration of each member in the heating device.
Figure 10:
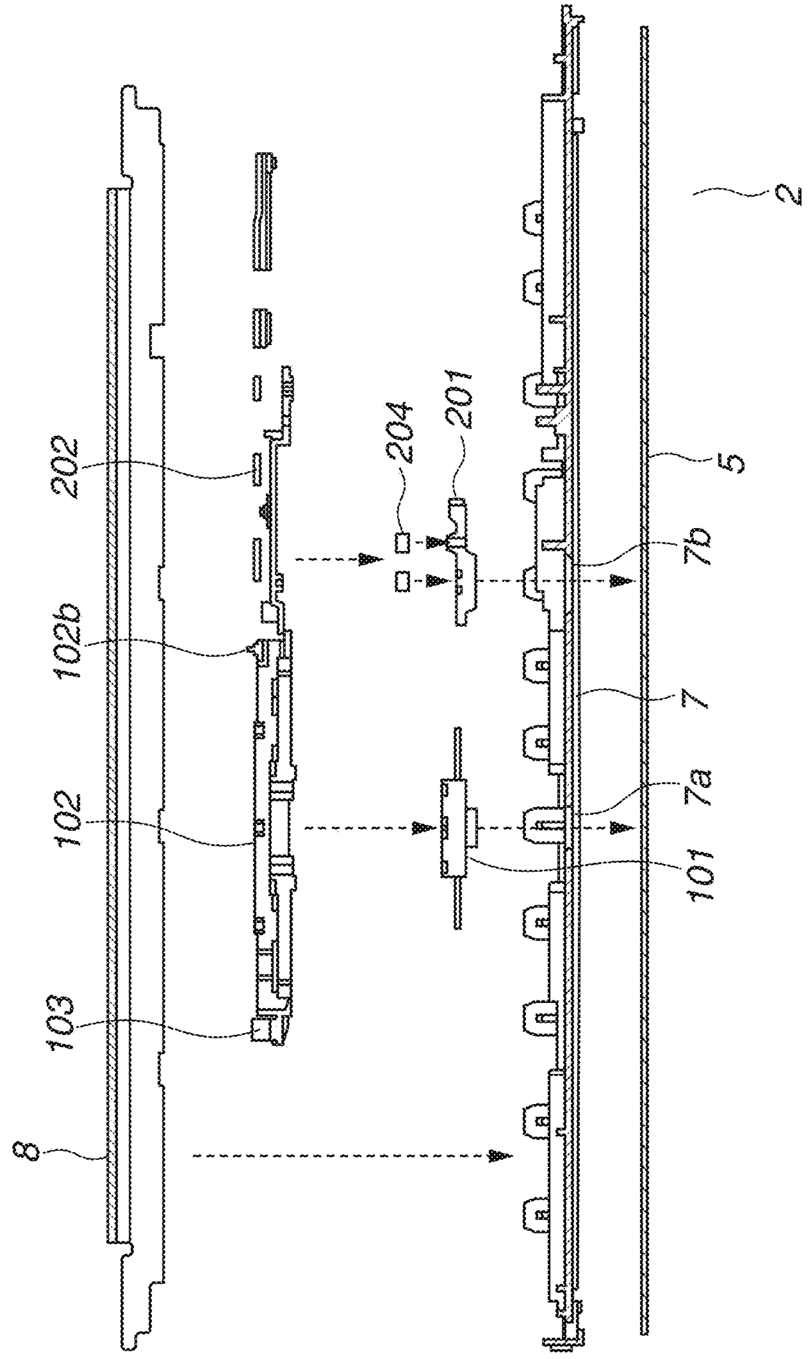
FIG. 10 is a cross-sectional view of the heating device in the longitudinal direction.
Figure 11:
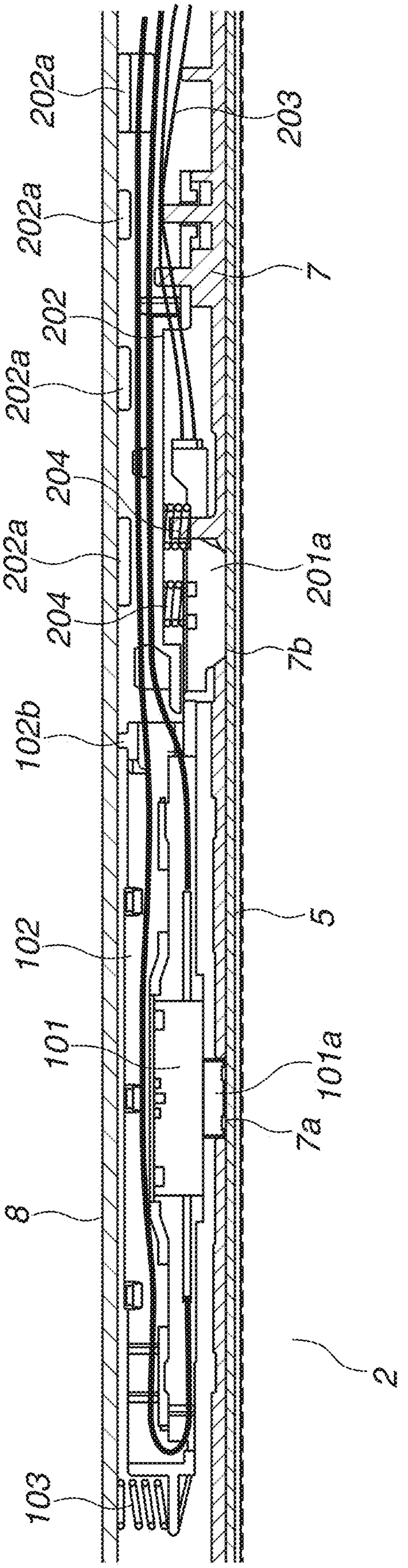
FIG. 11 is a cross-sectional view of a vicinity of a thermostat of the heating device in the longitudinal direction.

FIG. 9 is an exploded diagram illustrating a configuration of each member in the heating device 2. FIG. 10 is a cross-sectional view of the heating device 2 in the longitudinal direction. FIG. 11 is a cross-sectional view of a vicinity of the thermostat 101 of the heating device 2 in the longitudinal direction. The heating device 2 includes, in addition to the thermostat 101, the thermistor 201 that is a temperature detection member disposed in a hole portion 7*b* provided near the center part of the heater holder 7 in the longitudinal direction. The thermistor 201 successively detects the temperature and sends a detection result to a central processing unit (CPU) via a signal line 203. The CPU serving as a control unit controls power supply to the heater 5 so as to achieve a target temperature based on the detection result of the thermistor 201.

The thermostat 101 is disposed such that the abutting portion 101*a* engages with the hole portion 7*a* provided near the center part of the heater holder 7 in the longitudinal direction. The thermostat holder 102 holding the thermostat 101 is disposed at the position sandwiched between the heater holder 7 and the frame member 8 in the thickness direction of the heater 5. In the longitudinal direction of the heater 5, the thermostat spring 103 provided on the one end side of the thermostat holder 102 is locked to the frame member 8, and presses the thermostat holder 102 against the heater 5. The fulcrum 102*b* provided on the other end side of the thermostat holder 102 is also locked to the frame member 8. In other words, the other end side of the thermostat holder 102 is regulated in position by the frame member 8.

The thermistor 201 is disposed such that a temperature detection unit 201*a* engages with the hole portion 7*b* provided in the heater holder 7, at a position close to the connector 30 more than the thermostat 101 in the longitudinal direction, near the center part of the heater holder 7 in the longitudinal direction. To stably detect the temperature of the heater 5, the temperature detection unit 201*a* of the thermistor 201 is pressed against the heater 5 at desired pressure by thermistor springs 204 as illustrated in FIG. 10.

As illustrated in FIG. 11, the electric wire 104 of the thermostat 101 is disposed so as to pass through an upper side of the thermistor 201 in the thickness direction of the heater 5. To cause the electric wire 104 to pass through the upper side of the thermistor 201, a bundle wire guide 202 as a guide member that guides the electric wire 104 and locks the thermistor springs 204 urging the thermistor 201 to the heater 5, is disposed by being fixed to the heater holder 7. Guide ribs 202*a* of the bundle wire guide 202 are disposed in proximity to the frame member 8, and prevents the electric wire 104 from coming into contact with the frame member 8 and prevents the bundle wire guide 202 from being deformed by reaction force of the thermistor springs 204. The electric wire 104 is disposed so as to pass between the bundle wire guide 202 and the guide ribs 202*a* in the thickness direction of the heater 5, and is connected to the connector 30. In addition to guiding the electric wire 104, the bundle wire guide 202 may also be considered as a holding member for holding the thermistor 201 with one end side of the bundle wire guide 202 being urge by the thermistor springs 204 and another end side of the bundle wire guide 202 being regulated or held in position by the heater holder 7 (e.g. by being fixed to the heater holder 7).

As described above, the one end side of the thermostat 101 is urged by the thermostat spring 103, and the fulcrum 102*b* on the other end side is regulated in position by the frame member 8. This makes it possible to press the abutting portion 101*a* against the heater 5 without urging the both sides of the thermostat 101 by springs. The configuration requiring the thermostat spring 103 only on one side is adopted, which makes it possible to suppress increase in space by the springs. In addition, the electric wire 104 is caused to pass through the upper side of the thermistor 201 disposed in the same direction, which makes it possible to downsize the heating device 2.

In a third exemplary embodiment, disposition of the thermistor 201 will be described in addition to the thermostat 101. Configurations similar to the configurations according to the above-described first and second exemplary embodiments, for example, the image forming apparatus, are denoted by similar reference numerals, and detailed descriptions are omitted in the present exemplary embodiment.

Figure 12:
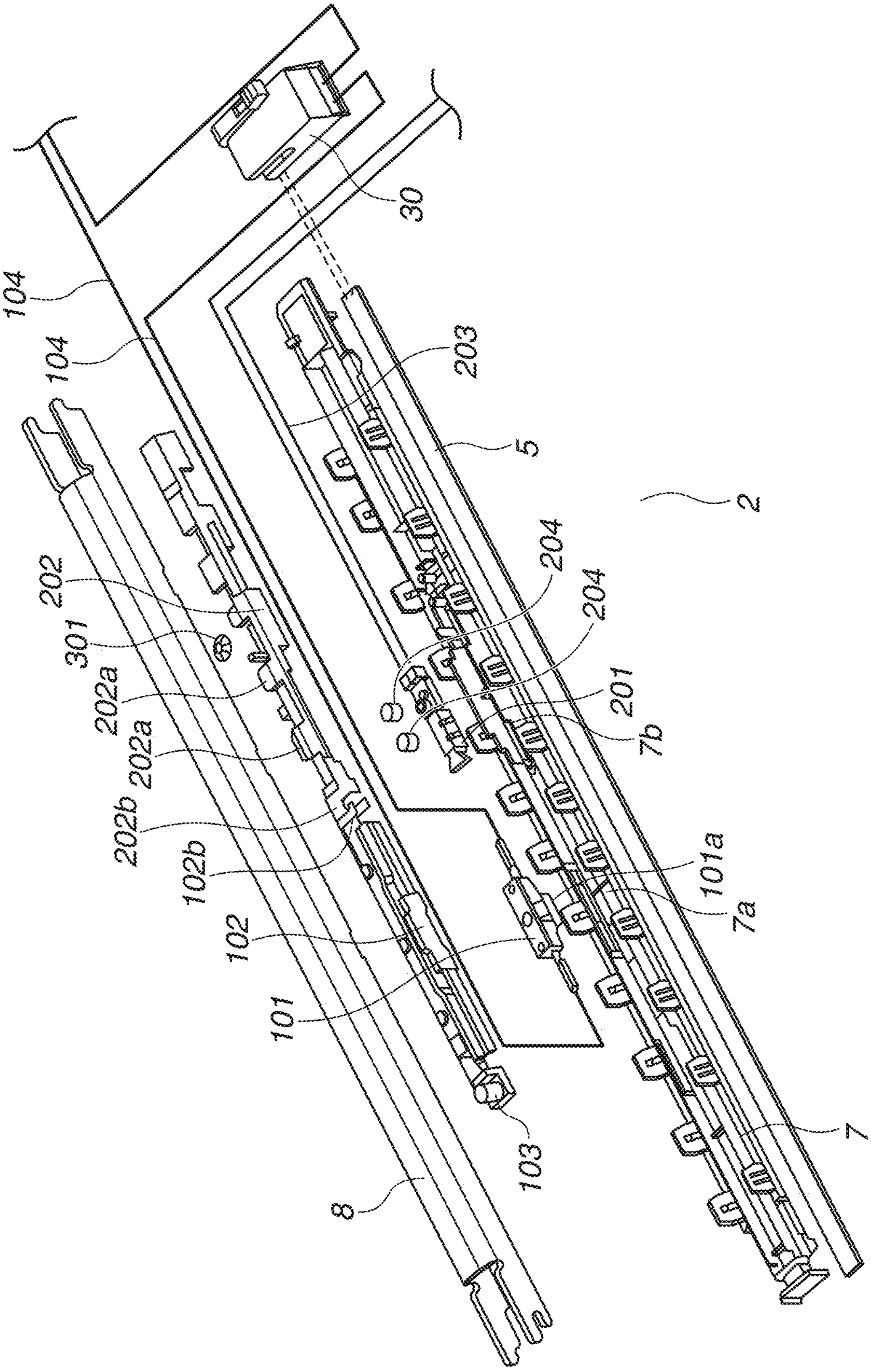
FIG. 12 is an exploded diagram illustrating a configuration of each member in the heating device.
Figure 13:
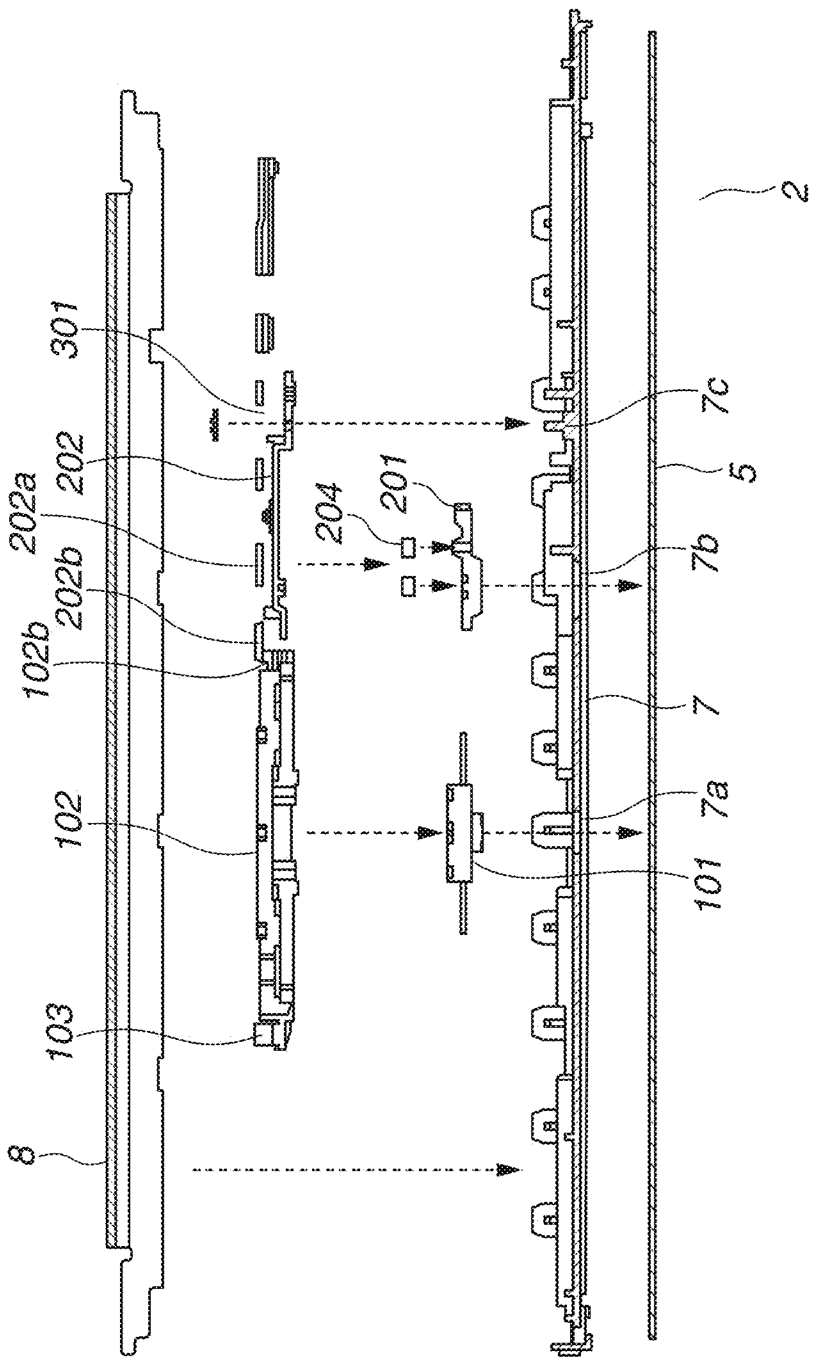
FIG. 13 is a cross-sectional view of the heating device in the longitudinal direction.
Figure 14:
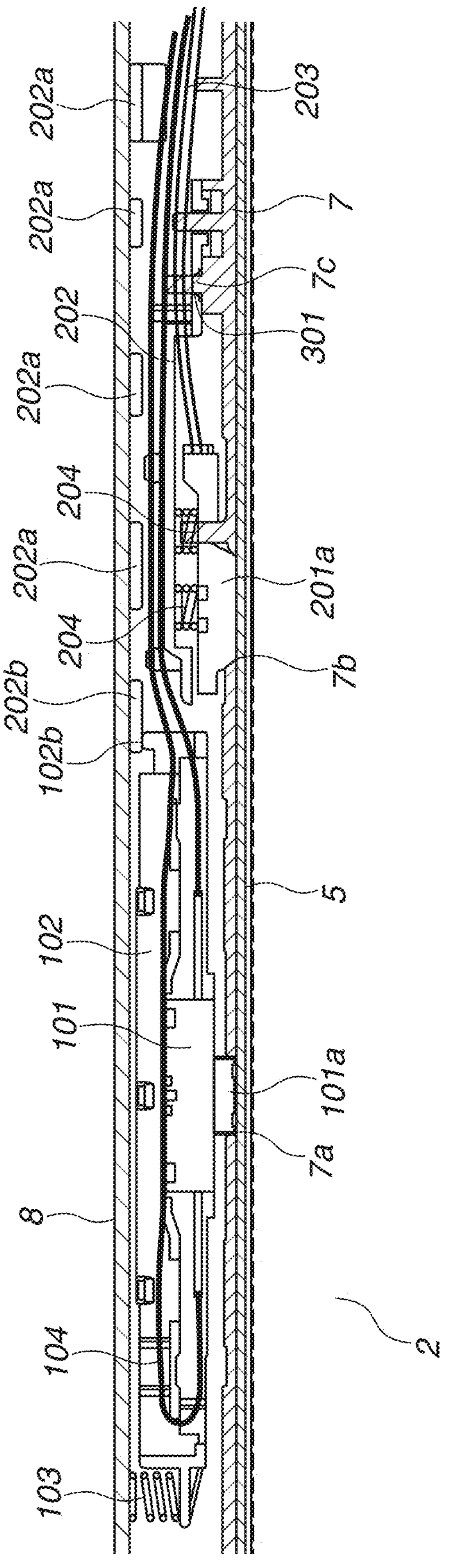
FIG. 14 is a cross-sectional view of the vicinity of the thermostat unit in the longitudinal direction.

FIG. 12 is an exploded diagram illustrating a configuration of each member in the heating device 2. FIG. 13 is a cross-sectional view of the heating device 2 in the longitudinal direction. FIG. 14 is a cross-sectional view of the vicinity of the thermostat 101 of the heating device 2 in the longitudinal direction. The heating device 2 includes, in addition to the thermostat 101, the thermistor 201 disposed in the hole portion 7*b* provided near the center part of the heater holder 7 in the longitudinal direction. The thermistor 201 successively detects the temperature of the heater 5, and the CPU serving as the control unit controls power supply to the heater 5 so as to achieve a target temperature, based on a result of the detection by the thermistor 201.

The thermostat 101 is disposed such that the abutting portion 101*a* engages with the hole portion 7*a* provided near the center part of the heater holder 7 in the longitudinal direction. The thermostat holder 102 holding the thermostat 101 is disposed at the position sandwiched between the heater holder 7 and the frame member 8 in the thickness direction of the heater 5. The thermistor 201 is disposed such that the temperature detection unit 201*a* engages with the hole portion 7*b* provided in the heater holder 7, at a position close to the connector 30 more than the thermostat 101 in the longitudinal direction, near the center part of the heater holder 7 in the longitudinal direction. To stably detect the temperature of the heater 5, the temperature detection unit 201*a* of the thermistor 201 is pressed against the heater 5 at desired pressure by the thermistor springs 204.

As illustrated in FIG. 12, the electric wire 104 of the thermostat 101 is disposed so as to pass through the upper side of the thermistor 201 in the thickness direction of the heater 5. To cause the electric wire 104 to pass through the upper side of the thermistor 201, the bundle wire guide 202 that guides the electric wire 104 and locks the thermistor springs 204 urging the thermistor 201 against the heater 5, is disposed by being fixed to the heater holder 7 as illustrated in FIG. 13. More specifically, the bundle wire guide 202 is fixed to a shaft 7*c* of the heater holder 7 by a push nut 301. The push nut 301 is a fastener that is inserted into a shaft not having a groove from a certain direction and is fixed at a predetermined position by catching an outer diameter of the shaft with claws on an inner diameter side. As illustrated in FIG. 14, the guide ribs 202*a* of the bundle wire guide 202 are disposed in proximity to the frame member 8, and prevents the electric wire 104 from coming into contact with the frame member 8 and prevents the bundle wire guide 202 from being deformed by reaction force of the thermistor springs 204. The electric wire 104 is disposed so as to pass between the bundle wire guide 202 and the guide ribs 202*a* in the thickness direction of the heater 5, and is connected to the connector 30.

The fulcrum 102*b* provided on the other end side of the thermostat holder 102 is locked to a locking portion 202*b* of the bundle wire guide 202. In other words, the fulcrum 102*b* is regulated in position by the locking portion 202*b*.

In place of the frame member 8, the locking portion 202*b* can serve as the regulation member regulating the position of the thermostat holder 102. The thermostat holder 102 is held on the heater holder 7. When the frame member 8 is attached thereto, the thermostat spring 103 provided on the one end side of the thermostat holder 102 is locked to the frame member 8. The guide ribs 202*a* and the locking portion 202*b* of the bundle wire guide 202 are disposed in proximity to the frame member 8, and are locked to the frame member 8. This prevents the electric wire 104 from coming into contact with the frame member 8 and prevents the bundle wire guide 202 from being deformed by reaction force of the thermistor springs 204. The locking portion 202*b* of the bundle wire guide 202 may be locked not to the frame member 8 but to the other member such as the heater holder 7.

As described above, the one end side of the thermostat 101 is urged by the thermostat spring 103, and the fulcrum 102*b* on the other end side is regulated in position by the locking portion 202*b*. This makes it possible to press the abutting portion 101*a* against the heater 5 without urging the both sides of the thermostat 101 by springs. The configuration requiring the thermostat spring 103 only on one side is adopted, which makes it possible to suppress increase in space by the springs. In addition, the electric wire 104 is caused to pass through the upper side of the thermistor 201 disposed in the same direction, which makes it possible to downsize the heating device 2.

Note that the configuration urging the thermostat unit 100 according to each of the first to third exemplary embodiments can be applied as a configuration urging not the thermostat 101 but the thermistor 201. As with the thermostat 101, the thermistor 201 is also held by a holder as a holding member. As described above, one end side of the holder holding the thermistor 201 can be urged by an urging member, and the other end side can be regulated by a regulation member. Further, the configuration in which the thermostat spring 103 urging the one end side of the thermostat 101 is locked to the frame member 8 is described. However, the thermostat spring 103 may be locked not to the frame member 8 but to the other member such as the heater holder 7 as long as pressing force by the thermostat spring 103 can be applied to the thermostat 101.

According to the configuration of any of the exemplary embodiments of the present invention, it is possible to provide the configuration urging the power shut-off member without urging both sides of the power shut-off member by the plurality of urging members.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A heating device, comprising:

an elongated heater;

a first holding member configured to hold the heater;

a power shut-off member configured to shut off power supply to the heater;

a second holding member configured to hold the power shut-off member;

an urging member configured to press the power shut-off member against the heater; and a regulation member configured to regulate a position of the second holding member, wherein the second holding member is regulated from moving in a thickness direction of the heater, wherein the urging member is in contact with one end side of the second holding member and is not in contact with another end side in a longitudinal direction of the heater, and wherein the regulation member is in contact with the other end side of the second holding member and is not in contact with the one end side in the longitudinal direction.

2. The heating device according to claim 1, wherein the urging member is locked to the regulation member.

3. The heating device according to claim 1, further comprising:

an electric wire connected to the power shut-off member, wherein the electric wire is connected to one end side and another end side of the power shut-off member, wherein the electric wire connected to the one end side of the power shut-off member is folded back from the one end side to the other end side, and wherein the urging member urges the second holding member at a position that is comparatively on an end side in comparison with a position where the electric wire is folded back.

4. The heating device according to claim 1, wherein the power shut-off member is engaged with an opening of the first holding member and is in contact with the heater.

5. The heating device according to claim 1, wherein, in the thickness direction, the power shut-off member is disposed between the first holding member and the regulation member.

6. The heating device according to claim 1, wherein the regulation member is a member reinforcing the first holding member.

7. The heating device according to claim 1, wherein the regulation member is a part of the first holding member.

8. The heating device according to claim 1, further comprising:

an electric wire connected to the power shut-off member, wherein the regulation member is a member guiding the electric wire.

9. The heating device according to claim 1, further comprising:

a first rotating body including an internal space inside which the heater disposed; and a second rotating body that is in contact with the first rotating body and forms a nip portion with the heater.

10. The heating device according to claim 9, wherein the first rotating body is a cylindrical film, wherein the second rotating body is a pressure roller, and wherein the heater is in contact with an inner circumferential surface of the cylindrical film.

11. An image forming apparatus, comprising:

an image forming unit configured to form an image on a sheet; and the heating device according to claim 1 configured to fix the image formed on the sheet.

* * * * *